(No Model.)
J. MACPHAIL.
GROUND WHEEL FOR HARVESTERS.
No. 547,794. Patented Oct. 15, 1895.
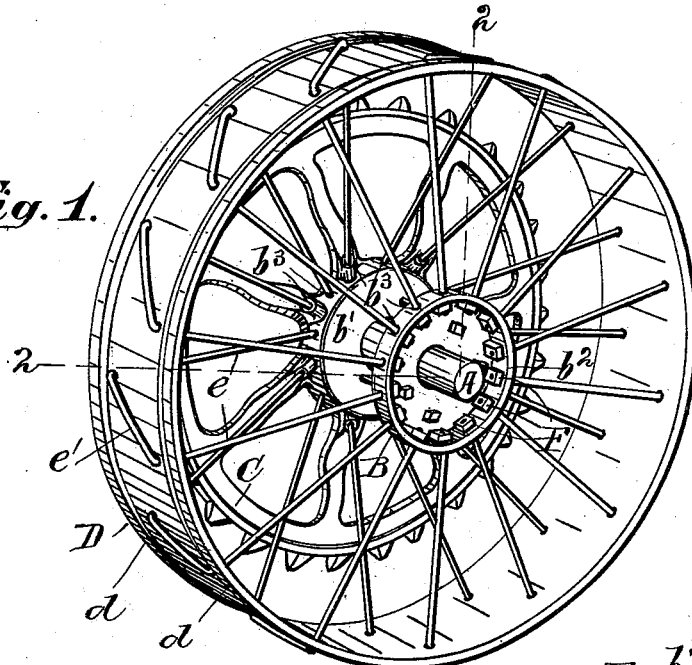
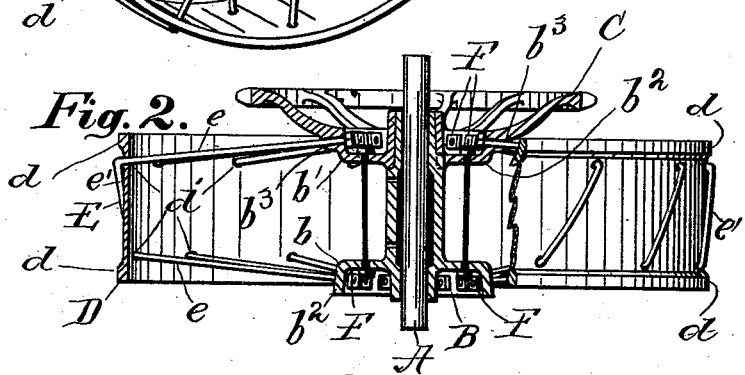
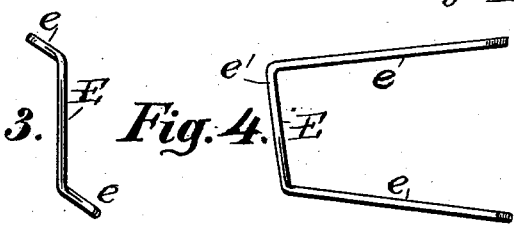
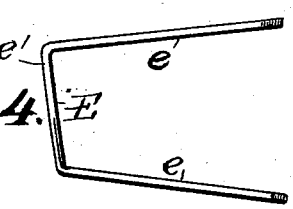
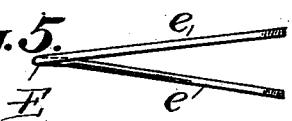
Witnesses
John B. Kaspari
A. A. Murray
Inventor
James Macphail
By _____
Attys

United States Patent Office.

JAMES MACPHAIL, OF BLUE ISLAND, ASSIGNOR TO THE PLANO MANUFACTURING COMPANY, OF CHICAGO, ILLINOIS.

GROUND-WHEEL FOR HARVESTERS.

SPECIFICATION forming part of Letters Patent No. 547,794, dated October 15, 1895.

Application filed May 14, 1894. Serial No. 511,138. (No model.)

*To all whom it may concern:*

Be it known that I, JAMES MACPHAIL, a citizen of the United States, residing at Blue Island, in the county of Cook and State of Illinois, have invented certain new and useful Improvements in Ground-Wheels for Harvesters, which are fully set forth in the following specification, reference being had to the accompanying drawings, in which—

Figure 1 represents a perspective view of a wheel embodying my invention; Fig. 2, a plan section of the same taken on the line 2 2 of Fig. 1; Fig. 3, a plan of one of the double spokes detached; Fig. 4, a side elevation of one of said spokes detached, and Fig. 5 an edge elevation of the same.

My invention relates to the ground or main wheel of harvesting-machines; and it consists in making each pair of metal spokes in one piece, a metal rod of suitable size and length being bent in the form of a loop to make a pair of spokes in one piece; and it further consists in the particular manner of applying and securing this bent loop to the wheel.

It has come to be the general practice to construct wheels for harvesters entirely of metal, and the present invention relates particularly to wheels of this type. In all of its main features the wheel may be of any ordinary construction, and the one in the drawings shows a construction well known, except in the spokes and the application thereof to the wheel-rim. A simple reference to nearly all of the different parts of the wheel is therefore all that is necessary in the present case.

In the drawings, A represents the axle and B the hub of a ground-wheel mounted on the axle and having at each end an enlarged cup-shaped flange $b$ $b''$, the edge $b^2$ of the cups projecting outward at each end of the hub about horizontally. As illustrated in the drawings, one of these cup-flanges $b'$ is made in one piece with the driving sprocket-wheel C, which is a usual form of construction, the sprocket-wheel being secured to one end of the hub, as indicated in Fig. 2.

The rim D of the wheel may be of any usual form. In the drawings it is shown as a wide flat rim of metal with a slight rib $d$ raised at each edge. Usually this rim or any other like rim is secured to the hub by separate spokes fastened at their respective ends to the rim and one or the other of the cup-flanges. In my improvement these spokes are made in pairs by bending a spoke rod or bar of sufficient length in the shape of a loop E, so that there will be formed two legs $e$, each of which is about the length required for an ordinary spoke, and the two are joined together at one end by a straight short section $e'$, at right angles to which the said legs are bent, as seen in Figs. 1, 2, and 4. These three sections of the loop are in a single piece, formed by bending a single rod, as above described. The legs of the loop, which are to serve as spokes, are also twisted or bent slightly away from each other in opposite directions from the plane of the connecting section. The wheel-rim D is provided with apertures $d'$, passing through it and arranged in pairs diagonally across the rim, as seen in Fig. 1. The distance between a pair of these apertures is the same as the length of the straight cross-section $e'$ of the spoke-loop. In setting up the wheel the two legs $e$ of the spoke-loops are passed in through these respective apertures, as seen in Figs. 1 and 2, and the extremities of these legs inserted, respectively, through suitable apertures $b^3$ in the projecting edges of the cups, and are secured in position by nuts F, which are turned on the ends of these pieces inside of the cups, as seen in Figs. 1 and 2, the said ends being threaded for this purpose. Obviously by turning the nuts up firmly against their seats in the cups the spoke-loop will be drawn down firmly upon the rim and the latter will be tightly secured to the hub; but owing to the twist given the legs of the loop, already described above, the ends as fastened to the hub-cups do not stand in the same plane lengthwise of the hub and axle, but alternate with each other in different planes, as seen in Fig. 1. It will also be seen from inspection of Figs. 1 and 2 that the legs of each loop when secured in place stand to a certain extent across each other, while the cross-section $e'$ of each loop is drawn down tight upon the outside of the wheel-rim and in a position diagonally across the same. This cross arrangement of the legs of the loop which form the spokes of the wheel when placed in position as described above effects a kind of bracing connection between the rim and the hub, thereby making the structure stronger than if these spokes stood parallel to each other. It will be noticed that the straight sections of the loop lie immediately upon the outside of the wheel-rim, thereby producing a set of rib-like projections on the outside of the rim which extend diagonally across the central or plain portion of the latter. These sections of the spoke-loop, therefore, have about the same relation to the wheel-rim as the ribs, which are usually cast or otherwise fixed thereon for the purpose of aiding the traction of the wheel by preventing it from slipping. This function of ribs on the surface of the wheel-rim is therefore performed by the spoke-loops in addition to that pertaining to the spokes themselves, described above.

With this improvement, under which each pair of spokes is formed in a continuous piece and is applied to and connects the two parts of the wheel together, as described, a very strong connection between the said two parts is obtained, and one that is very secure, because obviously there is no possibility of loosening anywhere, except at the hub ends of the spokes, and the fastening there is very simple and secure, though an old fastening. Furthermore, the construction is simplified by dispensing with a number of pieces which are required when the spokes are made separately and therefore are separately secured to the two parts of the wheel, as in the ordinary construction heretofore known; and, further, the ribs required on the surface of the wheel-rim are formed in the same piece with the spokes, or, in other words, are a part of the spokes themselves, which feature also simplifies and cheapens the construction of the wheel, inasmuch as nothing but a plain-faced rim is required, provided with a set of apertures adapted to receive the two spoke members of the loop. This method for providing the required ribs or ridges on the surface of the rim is especially adapted to a rim of convex form along the middle portion of the cross-section. This particular construction of the rim is not here shown, however, as it constitutes the subject-matter of another application for Letters Patent.

It is obvious that changes may be made in details of construction—such, for instance, as the shape of the rim and the means for connecting and securing the spokes to the hub—without departing from the main features of my invention, which have been set forth above.

The improvement has been described above as applied to ground-wheels for harvesters; but I do not wish to be understood as limiting the invention to this particular class of wheels, as obviously it is applicable to any ground-wheel for any agricultural or other machine or implement having similar functions.

Having thus described my invention, what I claim to be new, and desire to secure by Letters Patent, is—

In ground wheels for harvesters, the axle, A., in combination with a hub, B., having at one end a cup-shaped flange, $b$. in one piece with the hub, a separate cup-shaped flange, $b'$. set upon the opposite end of the hub, and having a sprocket wheel, C. made in one piece with the projecting rim of said cup flange, both cup rims being provided with a series of apertures, $b^3$., a wheel rim, D., provided with apertures, $d'$. arranged in circles running around the rim near the respective edges thereof and with the apertures in one circle alternating with those in the other, so that a line from an aperture near one edge of the rim to an aperture at the opposite edge thereof will run diagonally across the rim, and spokes, E., loop-shaped, being bent to form two sides, $e$. and a cross section, $e'$. at one end, with the said sides passed through a pair of the diagonally arranged apertures in the wheel rim and extended inward to the projecting rims of the cup flanges, crossing each other between the main wheel rim and the cup rims and having their lower ends passed through two apertures, $b^3$., in the rims of the respective cup flanges, arranged in a straight line parallel with the hub and secured therein by nuts turned on the ends of the said loop sides inside the respective cup rims, substantially as described.

JAMES MACPHAIL.

Witnesses:
  LE OTIE LEIB,
  ALLAN A. MURRAY.